United States Patent
A et al.

(10) Patent No.: US 10,892,952 B2
(45) Date of Patent: Jan. 12, 2021

(54) SUPPORTING COMPILATION AND EXTENSIBILITY ON UNIFIED GRAPH-BASED INTENT MODELS

(71) Applicant: Juniper Networks, Inc., Sunnyvale, CA (US)

(72) Inventors: Chandrasekhar A, Bangalore (IN); Jayanthi R, Coimbatore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/282,160

(22) Filed: Feb. 21, 2019

(65) Prior Publication Data

US 2020/0274772 A1  Aug. 27, 2020

(51) Int. Cl.
*H04L 12/24* (2006.01)
*H04W 88/12* (2009.01)
*H04W 92/22* (2009.01)

(52) U.S. Cl.
CPC ........ *H04L 41/145* (2013.01); *H04L 41/0893* (2013.01); *H04W 88/12* (2013.01); *H04W 92/22* (2013.01)

(58) Field of Classification Search
None
See application file for complete search history.

(56) References Cited

U.S. PATENT DOCUMENTS 5,870,559 A * 2/1999 Leshem ................. G06F 11/32
709/224
5,933,642 A 8/1999 Greenbaum et al.
6,078,744 A 6/2000 Wolczko et al.
(Continued)

FOREIGN PATENT DOCUMENTS

CN 109271621 A 1/2019
EP 2961100 A1 12/2015
(Continued)

OTHER PUBLICATIONS

Athanas et al., "An Adaptive Hardware Machine Architecture and Compiler for Dynamic Processor Reconfiguration," Laboratory for Engineering Man/Machine Systems, Division of Engineering, Brown University, 1991, 4 pp.
(Continued)

*Primary Examiner* — James A Edwards
(74) *Attorney, Agent, or Firm* — Shumaker & Sieffert, P.A.

(57) ABSTRACT

An example controller device manages a plurality of network devices. The controller device includes one or more processing units, implemented using digital logic circuitry, configured to receive data representing a modification to unified intent model represented by a graph model, determine one or more vertices of the graph model affected by the data representing the modification and one or more vertices to be added to the graph model to extend the unified intent model, update the one or more vertices of the graph model affected by the data representing the modification and add the one or more vertices to be added to the graph model, compile the updated one or more vertices and the added one or more vertices to generate low level configuration data for the plurality of network devices, and configure one or more of the plurality of network devices with the low level configuration data.

17 Claims, 10 Drawing Sheets

(56) References Cited

U.S. PATENT DOCUMENTS

| | | | |
|---|---|---|---|
| 6,678,646 | B1 | 1/2004 | McConnell et al. |
| 6,973,488 | B1 | 12/2005 | Yavatkar et al. |
| 7,209,473 | B1 | 4/2007 | Mohaban et al. |
| 8,266,416 | B2 | 9/2012 | Ishihara et al. |
| 8,571,882 | B1 | 10/2013 | Teitelbaum |
| 9,117,071 | B2 | 8/2015 | Beretta et al. |
| 9,727,339 | B2 | 8/2017 | Zelsnack |
| 9,734,056 | B2 | 8/2017 | Shi et al. |
| 10,102,172 | B1 | 10/2018 | Mai et al. |
| 10,200,248 | B1 | 2/2019 | Jiang et al. |
| 10,278,112 | B1 | 4/2019 | A et al. |
| 10,374,886 | B1 | 8/2019 | A et al. |
| 10,567,223 | B1 | 2/2020 | Sidaraddi et al. |
| 2004/0064538 | A1 | 4/2004 | Wong |
| 2009/0164773 | A1 | 6/2009 | Ishihara et al. |
| 2013/0191766 | A1 | 7/2013 | Ragusa et al. |
| 2014/0181797 | A1 | 6/2014 | Beretta et al. |
| 2015/0381515 | A1* | 12/2015 | Mattson ............. H04L 41/145 707/609 |
| 2016/0062746 | A1 | 3/2016 | Chiosi et al. |
| 2016/0211988 | A1 | 7/2016 | Lucas et al. |
| 2016/0269250 | A1 | 9/2016 | Astigarraga et al. |
| 2016/0342397 | A1 | 11/2016 | Goetz et al. |
| 2016/0350095 | A1 | 12/2016 | Ramachandran et al. |
| 2017/0054758 | A1 | 2/2017 | Maino et al. |
| 2017/0187577 | A1 | 6/2017 | Nevrekar et al. |
| 2018/0167277 | A1 | 6/2018 | Mahimkar et al. |
| 2018/0210927 | A1 | 7/2018 | Karam et al. |
| 2018/0276863 | A1* | 9/2018 | Nerurkar ................. G06T 11/60 |
| 2018/0329958 | A1* | 11/2018 | Choudhury ....... G06F 16/24568 |
| 2019/0182119 | A1 | 6/2019 | Ratkovic et al. |
| 2019/0266619 | A1 | 8/2019 | Namba et al. |
| 2020/0084120 | A1 | 3/2020 | A et al. |

FOREIGN PATENT DOCUMENTS

| | | | |
|---|---|---|---|
| FR | 2902954 | A1 | 12/2007 |
| WO | 2017204872 | A1 | 11/2017 |

OTHER PUBLICATIONS

Harrington et al., "An Architecture for Describing Simple Network Management Protocol (SNMP) Management Frameworks," Network Working Group, Request for Comments: 3411, Dec. 2002, 65 pp.

U.S. Appl. No. 15/462,465, filed Mar. 17, 2017, entitled "Configuring and Managing Network Devices Using Program Overlay on Yang-Based Graph Database".

Extended Search Report from counterpart European Application No. 191819002, dated Nov. 29, 2019, 9 pp.

Sivakumar et al., "Concepts of Network Intent," draft-moulchan-nmrg-network-intent-concepts-00, Internet Research Task Force, Oct. 28, 2017, 10pp.

Sadasivarao et al., "Demonstration of Advanced Open WDM Operations and Analytics, based on an Application-Extensible, Declarative, Data Model Abstracted Instrumentation Platform," 2019 Optical Fiber Communications Conference and Exhibition, OSA, Mar. 3, 2019, 3 pp.

Bjorklund, "YANG—A Data Modeling Language for the Network Configuration Protocol (NETCONF)," Internet Engineering Task Force, RFC 6020, Oct. 2010, 174 pp.

Bierman et al., "RESTCONF Protocol," IETF, RFC 8040, Jan. 2017, 137 pp.

Byron, "GraphQL: A data query language," https://code.fb.com/core-data/graphql-a-data-query-language/, Posted Sep. 14, 2015, 5 pp.

Nguyen, "Model-based Version and Configuration Management for a Web Engineering Lifecycle," Proceedings of the 15th International Conference on World Wide WEB, ACM, New York, NY, May 23, 2006, 10 pp.

Ribeiro et al., "G-Tries: an efficient data structure for discovering network motifs," Proceedings of the 2010 ACM Symposium on Applied Computing, New York, NY, Mar. 22, 2010, 8 pp.

Office Action received in related U.S. Appl. No. 16/370,243, dated Apr. 20, 2020, 37 pp.

Enns, "NETCONF Configuration Protocol," Network Working Group, RFC 4741, Dec. 2006, 96 pp.

"Openconfig," openconfig.net, 2016, 1 pp. (Applicant points out, in accordance with MPEP 609.04(a), that the year of publication, 2016, is sufficiently earlier than the effective U.S. filing date, so that the particular month of publication is not in issue.).

"OpenConfig," Github, github.com/openconfig, retrieved on Mar. 29, 2019, 3 pp.

"Gremlin Docs," gremlindocs.spmallette.documentup.com, retrieved on Mar. 29, 2019, 34 pp.

"Gremlin," Github, github.com/tinkerpop/gremlin/wiki, Jul. 11, 2016, 4 pp.

"Introduction to GraphQL," https://graphql.org/learn/, Accessed Sep. 20, 2018, 3 pp.

U.S. Appl. No. 16/370,189, Juniper Networks, Inc. (Inventor: Chandrasekhar A) filed Mar. 29, 2019.

U.S. Appl. No. 16/370,243, Juniper Networks, Inc. (Inventor: Chandrasekhar A) filed Mar. 29, 2019.

U.S. Appl. No. 16/144,313, Juniper Networks, Inc. (Inventor: Chandrasekhar A) filed Sep. 27, 2018.

U.S. Appl. No. 16/456,976, Juniper Networks, Inc. (Inventor: Chandrasekhar A) filed Jun. 28, 2019.

* cited by examiner

SUPPORTING COMPILATION AND EXTENSIBILITY ON UNIFIED GRAPH-BASED INTENT MODELS

TECHNICAL FIELD

This disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may support these services such that an administrator can easily create and manage these high-level network configuration services.

In particular, user configuration of devices may be referred to as "intents." An intent-based networking system lets administrators describe the intended network/compute/storage state. User intents can be categorized as business policies or stateless intents. Business policies, or stateful intents, may be resolved based on the current state of a network. Stateless intents may be fully declarative ways of describing an intended network/compute/storage state, without concern for a current network state. Application workflows may translate business policies into stateless intents. Controller devices support user intents, such that an administrator can describe the intended state of the network.

Intents may be represented as intent models, which may be modeled using unified graphs. Intent data models may be represented as connected graphs, so that business policies can be implemented across intent models. For example, data models may be represented using connected graphs having vertices connected with has-edges and reference (ref) edges. Controller devices may model intent models as unified graphs, so that the intend models can be represented as connected. In this manner, business policies can be implemented across intent models.

When Intents are modeled as Unified Graph model, extending new intent support needs to extend the graph model and compilation logic In order to configure devices to perform the intents, a user (such as an administrator) may write translation programs that translate high-level configuration instructions (e.g., instructions according to an intent model, which may be expressed as a unified graph model) to low-level configuration instructions (e.g., instructions according to a device configuration model). As part of configuration service support, the user/administrator may provide the intent model and a mapping between the intent model to a device configuration model.

In order to simplify the mapping definition for the user, controller devices may be designed to provide the capability to define the mappings in a simple way. For example, some controller devices provide the use of Velocity Templates and/or Extensible Stylesheet Language Transformations (XSLT). Such translators contain the translation or mapping logic from the intent model to the low-level device configuration model. Typically, a relatively small number of changes in the intent model impact a relatively large number of properties across device configurations. Different translators may be used when services are created, updated, and deleted from the intent model.

SUMMARY

In general, this disclosure describes techniques for managing network devices. A network management system (NMS) device, also referred to herein as a controller device, may configure network devices using low-level (that is, device-level) configuration data, e.g., expressed in Yang. Moreover, the controller device may manage the network devices based on the configuration data for the network devices. According to the techniques of this disclosure, the controller device allows administrators to describe an intended network/compute/storage state as may an "intent model," which may be represented as a graph model. The controller device may support parallel and incremental compilation and extensibility of the intent model using reactive mappers. The techniques of this disclosure also provide approaches to allow the same mapper for the intent create/update/delete scenarios for graph updates. The techniques of this disclosure also provide approaches to track the translations and triggering of deployments, once all translations are completed.

In one example, a method of managing a plurality of network devices includes receiving, by a controller device that manages a plurality of network devices, data representing a modification to a unified intent model represented by a graph model, determining, by the controller device, one or more vertices of the graph model affected by the data representing the modification and one or more vertices to be added to the graph model to extend the unified intent model, updating, by the controller device, the one or more vertices of the graph model affected by the data representing the modification and adding the one or more vertices to be added to the graph model, compiling, by the controller device, the updated one or more vertices and the added one or more vertices to generate low level configuration data for the plurality of network devices, and configuring, by the controller device, one or more of the plurality of network devices with the low level configuration data.

In another example, a controller device manages a plurality of network devices. The controller device includes one or more processing units, implemented using digital logic circuitry, configured to receive data representing a modification to unified intent model represented by a graph model, determine one or more vertices of the graph model affected by the data representing the modification and one or more vertices to be added to the graph model to extend the unified intent model, update the one or more vertices of the graph model affected by the data representing the modification and add the one or more vertices to be added to the graph model, compile the updated one or more vertices and the added one or more vertices to generate low level configuration data for the plurality of network devices, and configure one or more of the plurality of network devices with the low level configuration data.

In another example, a computer-readable storage medium has stored thereon instructions that, when executed, cause a processor of a controller device that manages a plurality of network devices to receive data representing a modification to unified intent model represented by a graph model, determine one or more vertices of the graph model affected by the data representing the modification and one or more vertices to be added to the graph model to extend the unified intent model, update the one or more vertices of the graph model affected by the data representing the modification and add the one or more vertices to be added to the graph model, compile the updated one or more vertices and the added one or more vertices to generate low level configuration data for the plurality of network devices, and configure one or more of the plurality of network devices with the low level configuration data.

The details of one or more examples are set forth in the accompanying drawings and the description below. Other features, objects, and advantages will be apparent from the description and drawings, and from the claims.

DETAILED DESCRIPTION

Figure 1:
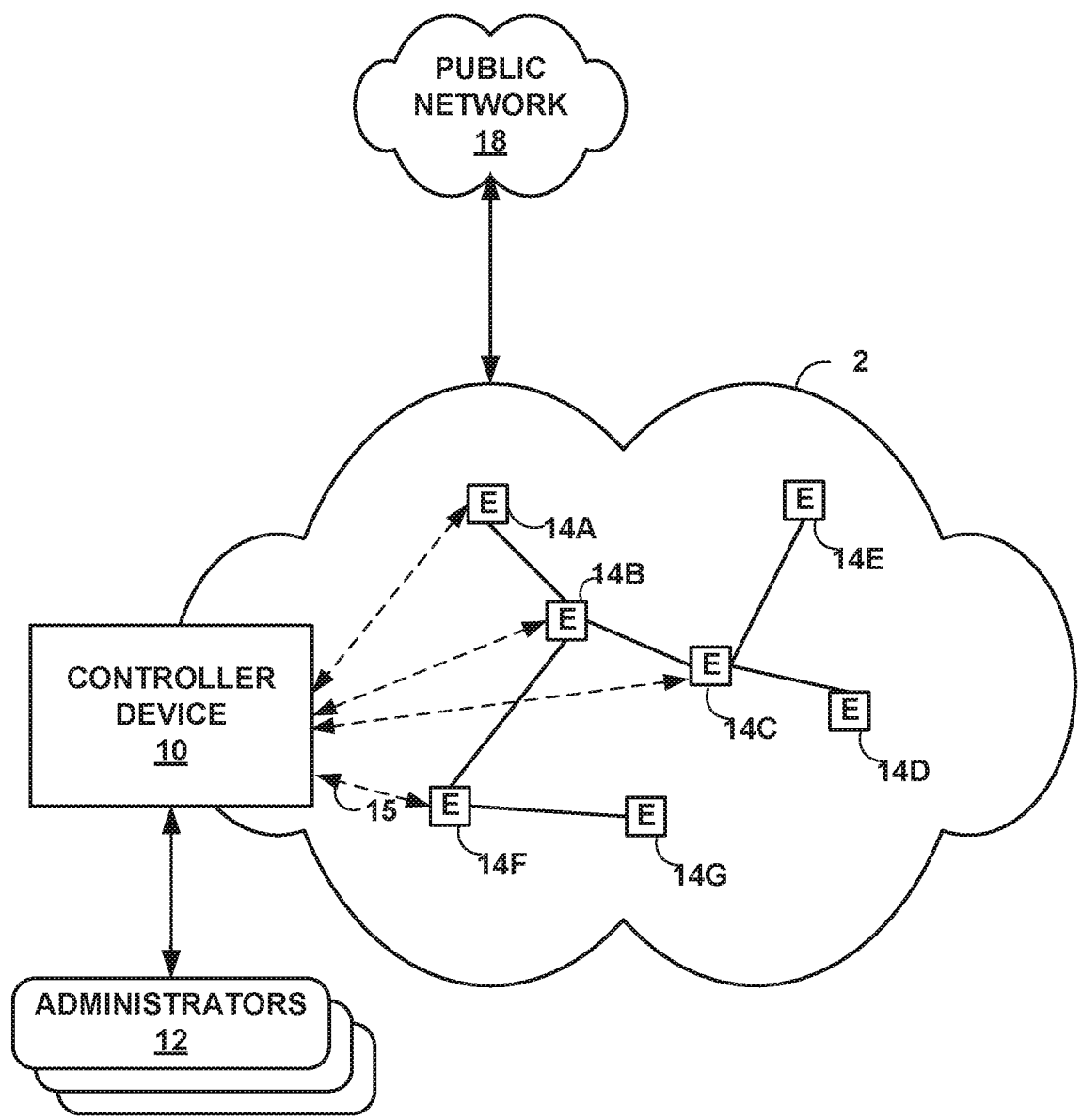
FIG. 1 is a block diagram illustrating an example including elements of an enterprise network that are managed using a management device.

FIG. 1 is a block diagram illustrating an example including elements of an enterprise network 2 that are managed using a controller device 10. Managed elements 14A-14G (collectively, "elements 14") of enterprise network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Controller device 10 is communicatively coupled to elements 14 via enterprise network 2. Controller device 10, in some examples, forms part of a device management system, although only one device of the device management system is illustrated for purpose of example in FIG. 1. Controller device 10 may be coupled either directly or indirectly to the various elements 14. Once elements 14 are deployed and activated, administrators 12 uses controller device 10 (or multiple such management devices) to manage the network devices using a device management protocol. One example device protocol is the Simple Network Management Protocol (SNMP) that allows controller device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

In common practice, controller device 10, also referred to as a network management system (NMS) or NMS device, and elements 14 are centrally maintained by an IT group of the enterprise. Administrators 12 interacts with controller device 10 to remotely monitor and configure elements 14. For example, administrators 12 may receive alerts from controller device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrators 12 uses controller device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element 14F, using controller device 10, to directly configure element 14F. In this manner, a user can provide commands in a format for execution directly to elements 14.

Further, administrators 12 can also create scripts that can be submitted by controller device 10 to any or all of elements 14. For example, in addition to a CLI interface, elements 14 also provide interfaces for receiving scripts that specify the commands in accordance with a scripting language. In a sense, the scripts may be output by controller device 10 to automatically invoke corresponding remote procedure calls (RPCs) on the managed elements 14. The scripts may conform to, e.g., extensible markup language (XML) or another data description language.

Administrators 12 uses controller device 10 to configure elements 14 to specify certain operational characteristics that further the objectives of administrators 12. For example, administrators 12 may specify for an element 14 a particular operational policy regarding security, device accessibility, traffic engineering, quality of service (QoS), network address translation (NAT), packet filtering, packet forwarding, rate limiting, or other policies. Controller device 10 uses one or more network management protocols designed for management of configuration data within managed network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, Dec. 2006, available at tools.ietf.org/html/rfc4741. Controller device 10 may establish NETCONF sessions with one or more of elements 14.

Controller device 10 may be configured to compare a new intent model to an existing (or old) intent model, determine differences between the new and existing intent models, and apply the reactive mappers to the differences between the new and old intent models. In particular, controller device 10 determines whether the new set of configuration data includes any additional configuration parameters relative to the old intent model, as well as whether the new set of configuration data modifies or omits any configuration parameters that were included in the old intent model.

The intent model may be a unified graph model, while the low-level configuration data may be expressed in Yang, which is described in Bjorklund, "Yang-A Data Modeling Language for the Network Configuration Protocol (NETCONF)," Internet Engineering Task Force, RFC 6020, Oct. 2010, available at tools.ietf.org/html/rfc6020. In some examples, the intent model may be expressed in JavaScript Object Notation (JSON). Controller device 10 may include various reactive mappers for translating the intent model differences. These functions are configured accept the intent model (which may be expressed as structured input parameters, e.g., according to Yang or JSON). The functions are also configured to output respective sets of low-level device configuration data changes, e.g., device configuration additions and removals. That is, y1=f1($x$), y2=f2($x$), . . . yN= fN($x$).

Controller device 10 may use Yang modeling for intent model and low-level device configuration models. This data may contain relations across Yang entities, such as list items and containers. Conventionally, controller devices do not support configuration management functions in real time. As discussed in greater detail below, controller device 10 may convert a Yang data model into a database model, and convert Yang validations into data validations. Techniques for managing network devices using a graph model for high level configuration data is described in "CONFIGURING AND MANAGING NETWORK DEVICES USING PROGRAM OVERLAY ON YANG-BASED GRAPH DATABASE," U.S. patent application Ser. No. 15/462,465, filed Mar. 17, 2017, the entire contents of which are hereby incorporated by reference.

This disclosure describes techniques that may address various issues. For example, this disclosure describes techniques that may support extensibility of the unified intent model. That is, customers, such as administrators 12, may need to extend the unified intent model based on devices of network 2 and extended compilation logic for the extended graph model. Furthermore, customers may add new applications to the graph model (e.g., a controller platform), which should allow for extensions to the graph model. Furthermore, customers may add new use cases to the controller platform, which may require extensions to the unified graph model, which should allow for extensions to the unified graph model. Such extensions may also require extensions to the compilation logic.

This disclosure also describes techniques by which compilation of the graph model into low-level configuration data can be parallelized. Moreover, when the graph model has been changed, this disclosure describes techniques for performing incremental compilation into the low level configuration data. In the case of graph model updates, incremental compilation refers to translation of only changes to the graph model from the intent model to low level configuration data. Furthermore, this disclosure describes techniques by which the same compiler logic (mappers) for intent create, update, and delete scenarios may be used for graph model updates. This disclosure also describes techniques for tracking translations and triggering deployment once all translations are completed.

As an example, controller device 10 may originally receive a graph model including "application-SD-WAN," which uses a GRE tunnel between network sites. Subsequently, one of administrators 12 determines that an IP-SEC tunnel needs to be added to the graph model. Rather than modifying an SD-WAN compiler, the techniques of this disclosure allow for augmenting compilation logic to extend the graph model, i.e., the intents model. In particular, a new vertex may be added to the unified intent model, which includes corresponding additional vertex compilation logic, without modifying other vertices in the unified intent model. These techniques are applicable for "use case" extensibility as well.

Suppose a controller platform has the following applications: a connectivity service controller (service provider connectivity services, VPNs), a WAN controller (provision LSPs), optical controller (provision lambdas), SD-WAN controller (core to customer network), and managing security. One of administrators 12 may have first installed the connectivity server controller. Later, when the WAN controller is installed, controller device 10 may receive instructions to extend the graph model with a WAN graph model (intent model). Subsequently, controller device 10 may receive graph model data related to managing security, which may require augmentation of the existing graph model and compilation logic. This disclosure describes techniques by which augmenting compilation logic for modification and/or extension. Such modification to compilation logic may also be applicable when one of administrators 12 extends the graph model (intent model) as well.

Controller device 10 may receive data from one of administrators 12 representing any or all of create, update, and/or delete actions with respect to the unified intent model. Controller device 10 may be configured to use the same compilation logic for each of create, update, and delete as applied to the graph model.

In some examples, a business policy modification may result in various vertices of the graph model being updated, across various relations (e.g., edges of the vertices). In some cases, new sites may be added, as well as overlay tunnels, undelay tunnel interfaces, and virtual router redundancy (VRR) associations. This disclosure recognizes that parallelized compilation of such changes may improve performance. Rather than performing serial compilation, which can result in site activation time of approximately 4 minutes (because the graph model is translated as workflow steps, each of which reads data multiple times), the techniques of this disclosure can allow parallel graph model change compilation, which may provide a 300% improvement compared to serial compilation.

Furthermore, rather than recompiling an entire graph model following changes to the graph model, this disclosure provides techniques for incremental compilation, which may reduce compilation time. That is, according to the techniques of this disclosure, controller device 10 may only compile changes to the graph model, rather than recompiling the entire graph model.

In accordance with the techniques of this disclosure, controller device 10 is configured to include reactive mappers that translate a unified intent model to a low level configuration model for elements 14. The reactive mappers are stateless mappers attached to graph model vertices that translate from the intent model (graph model) update to the low level configuration model. Controller device 10 may attach the reactive mappers to vertices, which allows the reactive mappers to watch for various dependent vertex updates. For example, when changes are made to a dependent vertex, or when new dependent vertices are added, the reactive mappers may be triggered. Controller device 10 may compile these reactive mappers and build a dependency graph. The dependency graph is a graph built based on an intent schema and the reactive mappers, which may combine changes and trigger the required reactive mappers for updates to the intent model. In accordance with this disclosure, an "intent" may be defined as a fully declarative way of describing an intended network/compute/storage state. To support incremental compilation, controller device 10 may read only modified vertices of the graph model (and dependent vertices thereof), and pass these vertices to the respective reactive mappers.

In particular, controller device 10 may include reactive mappers that translate a unified intent model (and changes thereto) to low level configuration model data. The reactive mappers may include resources and business logic, as well as compilation logic. An example IP-Sec element is shown below:

```
name: ipsec
version: 2018-12-20
description: Simple template to compile ipsec model
resource_context: site
resources :
  —
  name: spoke_device
  query: site(site_id){
      name
      device{
          name
      }
  }
  dependent_resources: gre_link
  —
  name: gre_link
  query: site(site_id) {
      name
          device{
              name
              termination_point[type:logical]{
                  name
                  link[type:gre] {
                      termination_point[type:physical]{
                          name
                      }
                  }
              }
          }
      }
  }
  —
  name: customer_settings
  input_resources:
      - spoke_device
  rest_api:
      method: GET
      service_name: local.csp-ems-central
      uri: /ems-central/customer/
output:
  //Template code to update the Low-level model.
```

Controller device 10 may construct a reactive mapper according to the following template elements.

| Property | Description |
| --- | --- |
| Name | Name of the Mapper |
| Version | Version of the Mapper |
| Resource_Context | Vertex type, on which the Mapper is attached |
| Resources | List of resources(Vertices) that would be fetched before business logic is executed. Resource can be fetched with in Graph model or can be fetched from external MS. |
| Name | Name of the Resource |
| Query | Query to fetch the resource from root source context |

| | | |
|---|---|---|
| | Input_resource | Resource query can refer to resources from other resources. The referred resources would be listed here |
| | Dependent_resources | A Resource can be dependent on other resource. The referred resources would be listed here. This may be required in update scenario. Based on this, system would fetch either all vertices of the resource type or updated vertices alone from graph. Ex: Consider the SD-WAN use case of FIG. 4. In the example IpSec mapper, it dependds on site, device, termination point, and WAN link. Here, the IpSec vertex depends on site. If site is modified, all the Ipsec links may be fetched and provisioned to the network. |
| | Rest-API | If resource needs to be fetched from other MS. |
| Output | | Contains the Template logic to generate the Low level model. |

The reactive mapper may have a name attribute, a version attribute, a resource context attribute, resources attributes, and an output attribute. The name attribute may define a name of the reactive mapper. The version attribute may define a version of the reactive mapper. The resource context attribute may define a vertex type on which the resource mapper is attached. The resources attributes may include a list of resources (e.g., vertices) that would be fetched before business logic is executed. Controller device 10 may fetch these resources from the graph model or from external data sources. The references may include a name attribute, a query attribute, an input resource attribute, a dependent resources attribute, and a REST API attribute. The name attribute may define a name of the resource. The query attribute may define a query to fetch the resource from a root resource context. The input resource attribute may define other resources to be retrieved. The dependent resources attribute includes a list of dependent resources for an update scenario. Controller device 10 may fetch either all vertices of the resource type or updated vertices from the graph model for updating. The REST API attribute indicates whether the resource needs to be fetched from an external device. The output attribute contains template logic to generate the low level model from the intent model.

Controller device 10 may maintain a complete intent schema according to a graph model. Controller device 10 may attach mappers to vertices of the graph model based on "resource context" in the mapper. Controller device 10 may compile the mappers to build a static dependency graph. For example, to construct the dependency graph, controller device 10 may operate according to the algorithm of the following pseudocode:

```
Build the graph with vertices specified in the schema.
Add has-edge and ref-edge across the vertex types, based on Parent-child
   and reference relation.
For every Reactive Mapper:
   Fetch the Root context (Path of the vertex in the Graph)
   Attach the Mapper id, to the vertex node.
   Attach the vertices(resources) used in Mapper. These are the watches
      for the reactive mapper.
```

When the intent database of controller device 10 is updated, controller device 10 may execute a graph model compiler to combine changes to the graph model and trigger the reactive mappers. The graph model compiler may correspond to a service that contains a set of reactive mappers to perform compilation from a graph model to low level configuration data. To generate low-level configuration data, controller device 10 may perform the following example algorithm:

```
Navigate dependency graph recursively from each updated vertex
   Parent vertex for child vertices changes
   Referred vertices
Check if any reactive mappers registered for the vertex and mapper are
   watching for the changed vertex
Add message (mapper ID, vertex context) to compiler stream
Reactive mapper fetches the dependent information based on resources in
   the reactive mapper.
```

The following pseudocode is an example for the algorithm above:

```
For every vertex change:
   Get the "node type" and navigate to the vertex (parent and referred
      vertex) in the dependency graph
   Navigate the dependency graph and check the reactive mappers
      attached to the connected vertices.
   Recursively navigate to the parent
   If the reactive mapper is attached, and changed vertex is referred
      to in the reactive mapper:
         Add to the translate_vertex map
      Check if the vertex is referred in dependency graph, recursively
         navigate to referrer
         If the reactive mapper is attached, and changed vertex is
            referred in Mapper
               Add to the translate_vertex map
For every Mapper in translate_vertex map:
   Trigger Reactive Mapper with vertices
Reactive_Mapper:
   Fetch_dependent_resources(vertices,Mapper)
   Call Translate API with resources.
```

Controller device 10 may execute an intent dependency query. This query may enable controller device 10 to fetch intent dependent information of reactive mappers. The intent dependency query follows GraphQL-based filters on the graph model (intent data model). Controller device 10 executes the reactive mapper to take resources to compile graph model changes (create, update, or delete). In the case of "updating of intent," few of the vertices of the graph model would be updated. That is, vertices may be added, updated, or deleted.

The techniques of this disclosure enable controller device 10 to use the same reactive mapper for create, update, and/or delete of vertices in the graph model. Based on the context, controller device 10 may fetch either all dependent vertices of the graph model, or the updated dependent vertices alone.

Fetching the updated vertices may include passing the state as a parameter. "Dependent_resources" in resource parameter in a reactive mapper may signify the dependent resources. If the dependent information is updated, controller device 10 may fetch all resources without state check. Controller device 10 may operate according to the algorithm of the following pseudocode:

```
Function fetch_resources(vertex [ ],Mapper)
    Formulate the Intent dependency query
    Get the resources
Intent dependency query(Vertex [ ],Mapper):
    For every resource in Mapper
        If any dependent resources are in the passed vertex list:
            Get the resource without state check
        Else
            Get the resource with the state check.
```

Figure 2:
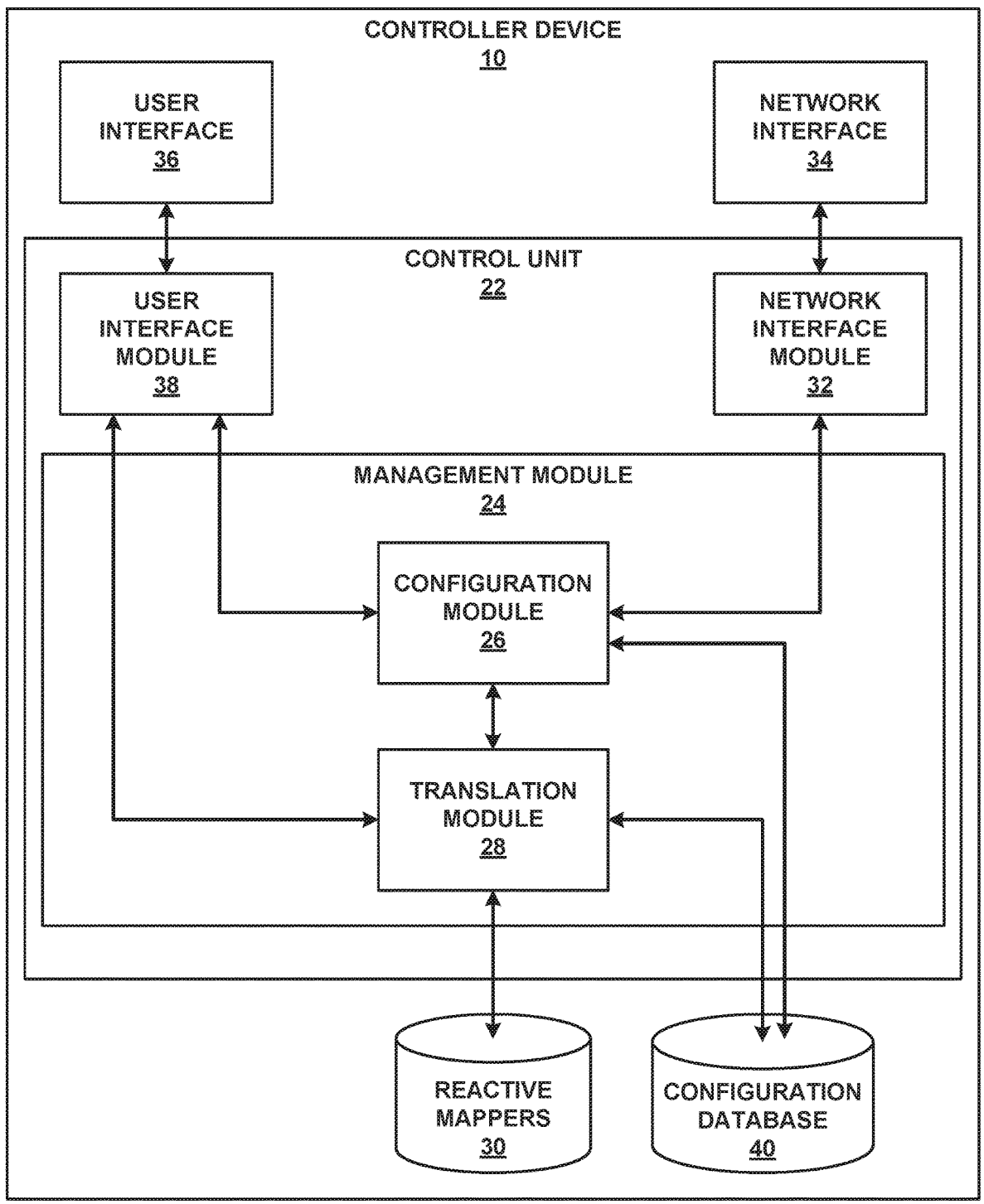
FIG. 2 is a block diagram illustrating an example set of components for the management device of FIG. 1.

FIG. 2 is a block diagram illustrating an example set of components for controller device 10 of FIG. 1. In this example, controller device 10 includes control unit 22, network interface 34, and user interface 36. Network interface 34 represents an example interface that can communicatively couple network device 20 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Controller device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrators 12 (FIG. 1) interacts with controller device 10, e.g., to provide input and receive output. For example, user interface 36 may represent one or more of a monitor, keyboard, mouse, touchscreen, touchpad, trackpad, speakers, camera, microphone, or the like. Furthermore, although in this example controller device 10 includes a user interface, it should be understood that administrators 12 need not directly interact with controller device 10, but instead may access controller device 10 remotely, e.g., via network interface 34.

In this example, control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Functionality of control unit 22 may be implemented as one or more processing units in fixed or programmable digital logic circuitry. Such digital logic circuitry may include one or more microprocessors, digital signal processors (DSPs), application specific integrated circuits (ASICs), field programmable gate arrays (FPGAs), or any other equivalent integrated or discrete logic circuitry, as well as any combination of such components. When implemented as programmable logic circuitry, control unit 22 may further include one or more computer readable storage media storing hardware or firmware instructions to be executed by processing unit(s) of control unit 22.

Control unit 22 executes management module 24 to manage various network devices, e.g., elements 14 of FIG. 1. Management includes, for example, configuring the network devices according to instructions received from a user (e.g., administrators 12 of FIG. 1) and providing the user with the ability to submit instructions to configure the network devices. In this example, management module 24 further includes configuration module 26 and translation module 28.

Management module 24 is configured to receive intent unified-graph-modeled configuration data for a set of managed network devices from a user, such as administrators 12. Such intent unified-graph-modeled configuration data may be referred to as an "intent model." Over time, the user may update the configuration data, e.g., to add new services, remove existing services, or modify existing services performed by the managed devices. The unified intent model may be structured according to, e.g., Yang or JSON. The graph model may include a plurality of vertices connected by edges in a hierarchical fashion. In Yang, edges of graph models are represented though "leafref" elements. In the case of JSON, such edges may be represented with a "ref" edge. Similarly, parent to child vertex relations can be represented with a "has" edge. For example, a vertex for Element A refers to a vertex for Element B using a has-edge can be understood to mean, "Element A has Element B." In some examples, management module 24 also provides the user with the ability to submit reactive mappers that translation module 28 executes to transform the intent model to device-specific, low-level configuration instructions.

Controller device 10 also includes configuration database 40. Configuration database 40 generally includes information describing managed network devices, e.g., elements 14. For example, configuration database 40 may include information indicating device identifiers (such as MAC and/or IP addresses), device type, device vendor, devices species (e.g., router, switch, bridge, hub, etc.), or the like. Configuration database 40 also stores current configuration information (e.g., intent model, or in some cases, both intent model and low level configuration information) for the managed devices (e.g., elements 14). In accordance with the techniques of this disclosure, configuration database 40 may include one or more sets of public or private HLM configuration, LLM configuration, and/or device level configuration.

Translation module 28 determines which of reactive mappers 30 to execute on the intent model based on the information of configuration database 40, e.g., which of the devices are to receive the low-level configuration instructions. Translation module 28 then executes each of the determined reactive mappers of reactive mappers 30, providing the intent model to the reactive mappers as input and receiving low level configuration instructions.

Configuration module 26 may first determine an existing intent model for each service performed by the devices for which configuration is to be updated, e.g., by retrieving the intent model for each of the services from configuration database 40. Configuration module 26 may then compare the existing intent model to the newly received intent model, and determine differences between the existing and newly received intent models. Configuration module 26 may then add these changes to the compiler stream, and reactive mappers 30 may then translate these changes to low level configuration information. Configuration module 26 also updates the existing intent model recorded in configuration database 40 based on the newly received intent model.

In some examples, reactive mappers 30 that perform update translations (that is, translating changes in the unified intent model that results in updates to values of low-level configuration information, without creation or deletion of elements in the low-level configuration data) may operate as follows. In one example, the reactive mappers 30 that perform updates may override single elements. That is, performance of these reactive mappers may result in deletion of an element value, e.g., by replacing an old element value with a new value. Sometimes, a single value in a configuration service model can be mapped to a list in a device configuration. In these cases, translation module 28 may send the old value as well as the new value.

Translation module 28 (which may be configured according to reactive mappers 30) may use the same reactive mapper for creation, updates, and deletion of intent model vertices. Because each vertex has its own corresponding reactive mapper, compilation can be performed in parallel. That is, the reactive mappers of each of the vertices of the graph model representing the unified intent model can be executed in parallel, thereby achieving parallel compilation. Translation module 28 may be configured to allow processing of only impacted intent model data changes (i.e., those elements in the intent model that are impacted by the changes). Based on reactive mappers 30, translation module 28 may infer dependencies across vertices in the intent model. When the intent model is changed, translation module 28 may publish messages in the compiler stream based on a dependency graph, as discussed above.

When a "create" template is uploaded (that is, a reactive mapper of reactive mappers 30 that processes new data in intent model configuration information, relative to existing intent model configuration information), translation module 28 may determine the dependencies using the dependency graph. When the service is changed, translation module 28 may generate a difference between the existing intent model configuration information and the new intent model configuration information, based on the dependencies. Translation module 28 may then use the reactive mapper of reactive mappers 30 to process the difference, and thereby translate the intent model configuration information to low level configuration instructions. Translation module 28 may then provide the low level configuration instructions to configuration module 28.

After receiving the low level configuration instructions from translation module 28, configuration module 28 sends the low level configuration instructions to respective managed network devices for which configuration is to be updated via network interface module 32. Network interface module 32 passes the low level configuration instructions to network interface 34. Network interface 34 forwards the low level configuration instructions to the respective network devices.

Although user interface 36 is described for purposes of example as allowing administrators 12 (FIG. 1) to interact with controller device 10, it should be understood that other interfaces may be used in other examples. For example, controller device 10 may include a representational state transfer (REST) client (not shown) that may act as an interface to another device, by which administrators 12 may configure controller device 10. Likewise, administrators 12 may configure elements 14 by interacting with controller device 10 through the REST client.

In accordance with the techniques of this disclosure, management module 24 may model configuration database 40 as a graph database representing Yang configuration data elements. Yang specifies various types of data structures, including lists, leaflists, containers, containers with presence, and features. Management module 24 may model each of lists, containers, containers with presence, and features, as well as a top level container, as vertices in a graph database.

In particular, management module 24 may model a list node in a Yang model as a vertex of the graph database. "Min-elements" and "max-elements" place constraints on edges between parent vertices and list node vertices. Management module 24 may model leaf nodes, leaf lists, and the like as properties of the vertices.

Management module 24 may also model container attributes as parent vertex attributes. Management module 24 may specify a container name preceding the attribute name. For example, the following is an example Yang container.

```
list sdwan {
    key name;
    leaf name { type string;}
    list site {
        leaf name { type string;}
        leaf topo-role {
            type enumeration {
                enum "hub";
                enum "spoke";
                enum "both"
            }
        }
        leaf device-refs {
            type leafref {
                path /sdwan/device;
            }
        }
    }
    list device {
        leaf owner {type string;}
        leaf vendor {type string;}
        leaf management-status {
            type enumeration {
                enum "modelled";
                enum "managed";
                enum "activated";
            }
        }
        leaf authentication-type {type string;}
    }
}
```

In this example, management module 24 would model sdwan as a vertex and specify attributes of the vertex as including the attribute "name," a "site" vertex having attributes name and topo-rope, and a "device" vertex having attributes owner, vendor, management-status, and authentication-type. There will be a has-edge from the sdwan vertex to the site vertex, and a ref-edge from the site vertex to the device vertex.

Management module 24 may model containers with presence as a parent vertex attribute. Management module 24 may model all features as part of a feature vertex. In particular, management module 24 may construct a single feature vertex, and specify each of the Yang features as a corresponding attribute of the feature vertex. Management module 24 may further specify values for the attributes to signify whether the feature is supported or not. Management module 24 may further model a top level Yang container as a vertex of the graph database.

Management module 24 may further connect the various vertices discussed above using edges to form the graph database. Management module 24 may use two kinds of edges: containment edges and reference edges. Containment edges may also be referred to as "has-edges." That is, when an element corresponding to a first vertex "contains" an element corresponding to a second vertex (and thus, the first vertex "has" the second vertex), management module 24 may connect the first vertex to the second vertex using a containment edge, or has-edge. Thus, a vertex containing another vertex brings the "has" relation across the vertices. As another example, list to list containment brings the "has-edge" relation between vertices to which the list elements correspond, where management module 24 may construct such edges between these vertices. If management module 24 deletes a parent vertex, management module 24 may also automatically delete child vertices associated with has-edges of the parent vertex. Management module 24 may construct reference edges between vertices as well. A leaf-reference may bring the reference edge between the vertices and capture a "refer" property.

Management module 24 may model an "ordered by user" attribute on a vertex as an "edge property"-"order" between a parent vertex to a current vertex. Management module 24 may specify an integer value for the attribute.

Yang specifies semantics for data. Such semantics may impose constraints on vertex properties and edge properties of a graph database modeled after Yang data. Management module 24 may perform a validation process on properties of the vertices and edges to enforce validations. Management module 24 may also set values to vertex nodes, e.g., as part of the validation process.

After constructing a graph database as discussed above, management module 24 may perform operations on data of the graph database. For example, management module 24 may map Netconf-based operations, such as get-config, get-config with filters, and edit-config, to graph query language queries, such as Gremlin queries. Gremlin is described in GremlinDocs at gremlindocs.spmallette.documentup.com and in github.com/tinkerpop/gremlin/wiki. Management module 24 may execute conditions mapped to vertices and edges of the graph database if the condition attributes are changed. In response to the conditions, management module 24 may process additional changes, handled as functions as discussed in greater detail below. Management module 24 may further update all changes in transaction semantics.

As discussed above, in accordance with the techniques of this disclosure, controller device 10 may receive data representing modification to the unified intent model represented by a graph model. The graph model may be stored in configuration database 40. Translation module 28 may compare the received data representing the modification to the current graph model of configuration database 40 to determine one or more vertices of the graph model affected by the data representing the modification. Translation module 28 may then update the one or more vertices of the graph model affected by the data representing the modification. In particular, translation module 28 may add messages in the form of <mapper ID, vertex action> to a compiler stream to cause reactive mappers 30 to perform respective actions on respective vertices indicated by respective mapper IDs. Translation module 28 may then cause reactive mappers 30 to compile the updated one or more vertices (without compiling other vertices of the graph model not impacted by the modifications to the graph model) to generate low level configuration data for the plurality of network devices, e.g., elements 14 of FIG. 1. Translation module 28 may provide the generated low level configuration data to configuration module 26, which may configure one or more of the plurality of network devices with the low level configuration data. In particular, configuration module 26 may distribute the low level configuration data to elements 14 via network interface module 32 and network interface 34.

In this manner, controller device 10 represents an example of a controller device that manages a plurality of network devices and is configured to receive data representing a modification to unified intent model represented by a graph model, determine one or more vertices of the graph model affected by the data representing the modification and one or more vertices to be added to the graph model to extend the unified intent model, update the one or more vertices of the graph model affected by the data representing the modification and add the one or more vertices to be added to the graph model, compile the updated one or more vertices and the added one or more vertices to generate low level configuration data for the plurality of network devices, and configure one or more of the plurality of network devices with the low level configuration data.

Figure 3:
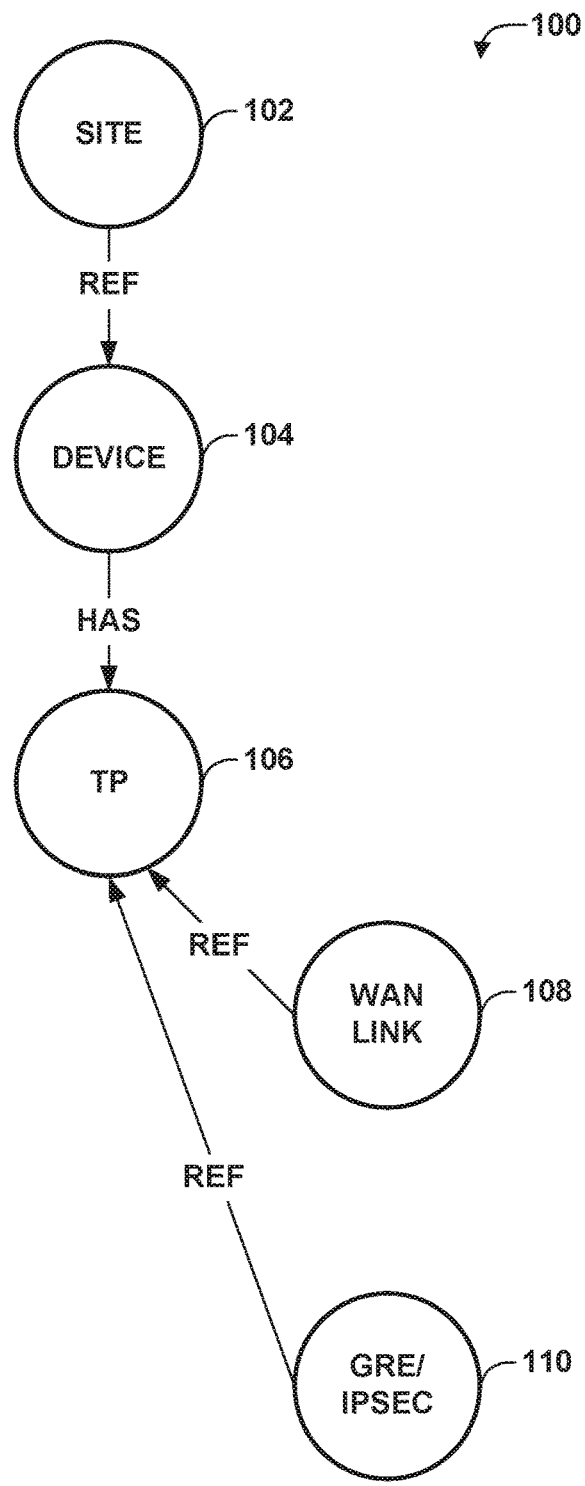
FIG. 3 is a conceptual diagram illustrating an example unified graph intent model.

FIG. 3 is a conceptual diagram illustrating an example unified graph intent model 100. Unified graph intent model 100 represents an example of an intend model for software-defined networking in a wide area network (SDWAN). That is, a use case involving an SDWAN includes data for site, device, termination point in the device (network interface), WAN link, and GRE in the unified intent model represented as a graph. Thus, unified graph intent model 100 includes site vertex 102, device vertex 104, termination point (TP) vertex 106, wide area network (WAN) link vertex 108, and generic routing encapsulation (GRE)/IP Security (IPSEC) vertex 110. Site vertex 102, WAN link vertex 108, and GRE/IPSEC vertex 110 each have a respective reference "ref" edge to device vertex 104, and device vertex 104 has a "has" edge to TP vertex 106.

Although only one TP vertex 106 is shown, a device represented by device vertex 104 can have multiple TP vertices for respective network interfaces. A WAN link is associated with TPs of different devices. A GRE/IPSEC tunnel can be associated to TPs of two devices on which the tunnel is to be stablished.

Figure 4:
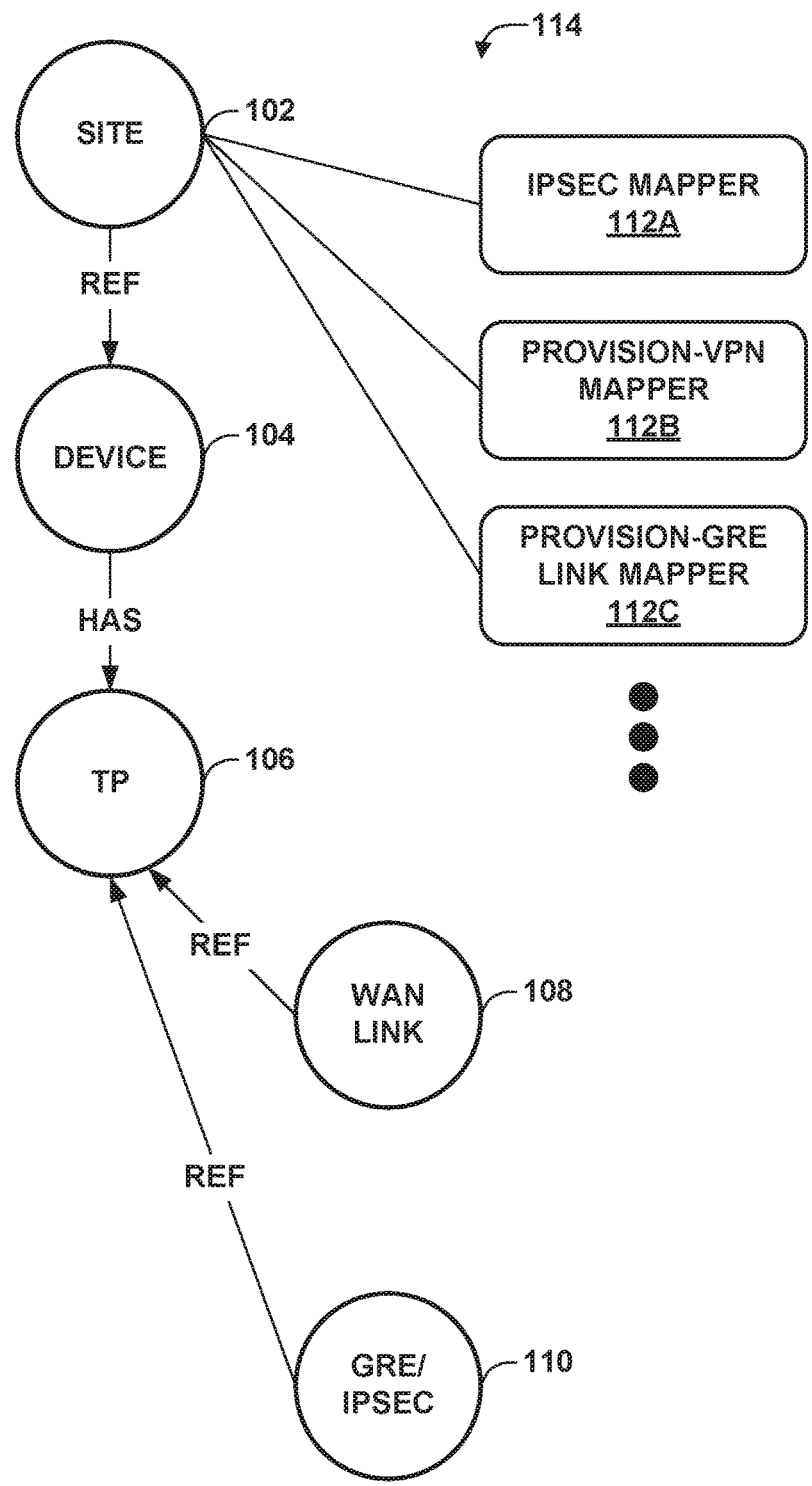
FIG. 4 is a conceptual diagram illustrating a dependency graph, representing reactive mappers for a site vertex of the unified graph intent model of FIG. 3.

FIG. 4 is a conceptual diagram illustrating dependency graph 114, representing reactive mappers 112A-112C for site vertex 102 of unified graph intent model 100 of FIG. 3. In particular, FIG. 4 shows site vertex 102 as including an IPSec mapper 112A, a provision-VPN mapper 112B, and a provision-GRE link mapper 112C. IPSec mapper 112A includes a root of site vertex 102 and watch vertices of site vertex 102, device vertex 104, TP vertex 106, WAN link vertex 108, and IPSec vertex 110. Additional reactive mappers may be included for any of the vertices of unified graph intent model 100. As explained above, reactive mappers may be attached to a vertex of a unified intent model to compile changes made to vertices of the graph representing the unified intent model.

Controller device 10 of FIG. 1 may use reactive mappers 112A-112C and the corresponding unified intent model to generate dependency graph 114. As an example, IPSec mapper 112A depends on site, device, termination point, and WAN link. Additionally, GRE/IPSEC vertex 110 depends on site vertex 102. If site vertex 102 is modified, controller device 10 may fetch all IPSec links and provision the IPSec links to the network, using dependency graph 114.

Referring again to the example pseudocode above, controller 10 may perform the following example with respect to the example IP-Sec mapper 112A of FIG. 4. Gre_link resource query may add a state check if the site is not updated. Otherwise, the gre_link resource query may add a state check, so that updated links alone would be fetched.

```
Query: site(site_id) {
    name
        device{
            name
            termination_point[type:logical]{
                name
                link[type:gre] {
                    Termination_point[type:physical && state
                    ="modified" ]{
                        name
                    }
                }
            }
        }
}
```

As graph model compilation happens through reactive mappers, controller device 10 may include a mechanism for tracking compilation progress. Once compilation is completed, controller device 10 may group and commit low level configuration data per network element to elements 14. Controller device 10 may use change sets, which are groups of the changes of a graph model change request. If there is any failure during compilation, controller device 10 may abort compilation and notify administrators 12.

Controller device 10 may operate according to the following algorithm:

```
Create a change-set for every graph model change request (e.g., a graph of
    vertex changes).
    The change-set contains one or more "change entities." Each change
    entity contains the list of vertex UUIDs updated in one batch. A batch
    update is an application request to make a batch of vertex changes as
    part of a graph model (intent) update.
Controller device 10 compiles each change entity through one or more
    reactive mappers.
When an application makes a graph model (intent) change:
    Controller device 10 creates a change set, with a change entity. This
        change entity contains a list of vertex IDs.
    During compilation, controller device 10 groups the changes and adds
        them to a compiler stream. The compiler stream is a data stream
        to which reactive mappers are subscribed, and messages added
        to the data stream contain the mapper ID and vertices. Controller
        device 10 compiles messages in the compiler stream with
        reactive mappers.
    After all messages are compiled, controller device 10 marks the
        change entity as "compiled."
    Each reactive mapper may generate one or more low level
        configuration data changes. Controller device 10 may create a
        change entity for low level configuration data changes.
    Once the low level configuration data has been completed from
        compilation, controller device 10 may group all network element
        changes and deploy the changes to elements 14 together.
```

The graph model for the unified intent model may support extensibility because controller device 10 may extend use cases, and administrators 12 can extend the graph model.

For an "add" use case, administrators 12 may add new graph model vertices and/or relations within existing graph models. This may include adding one or more vertices and/or relations (e.g., edges) between vertices of the graph models. This may also include adding reference edges or child vertices to parent vertices.

Extending compilation can be achieved through writing additional compilation logic, which can be achieved by plugin of additional reactive mappers. If any customization is required on a specific reactive mapper, that mapper alone can be replaced. This approach allows the modularization of compilation logic, so that it can be extended.

Controller device 10 may operate according to the algorithm of the following pseudocode for graph model extensibility:

```
For each new reactive mapper:
    Compile the reactive mapper:
        Populate resource name and path information
        Update the dependnecy graph with new vertices and reactive mapper
```

To accommodate input from administrators 12, extending the graph model may include augmenting the graph model (intent model) and/or augmenting compilation logic. To augment the graph model, in the case of Yang, controller device 10 may obtain a new Yang submodule, which augments an existing graph model. The new Yang submodule may introduce new graph model vertices and/or associations to the vertices of the graph model. To add a new reference, controller device 10 may add a vertex and a reference edge association to existing vertices. Controller device 10 may follow a similar approach for a JSON model.

To augment compilation logic, a new reactive mapper (e.g., one of mappers 112A-112C of FIG. 4, or a new mapper not shown in FIG. 4) based on the syntax described above may be used. Controller device 10 may fetch corresponding resources along with state information. Compilation logic may be written by accessing the resource. Every resource may be populated with state information. The compilation can use state and handle create, update, and delete scenarios. To modify compilation logic, controller device 10 may update the corresponding reactive mappers.

Figure 5:
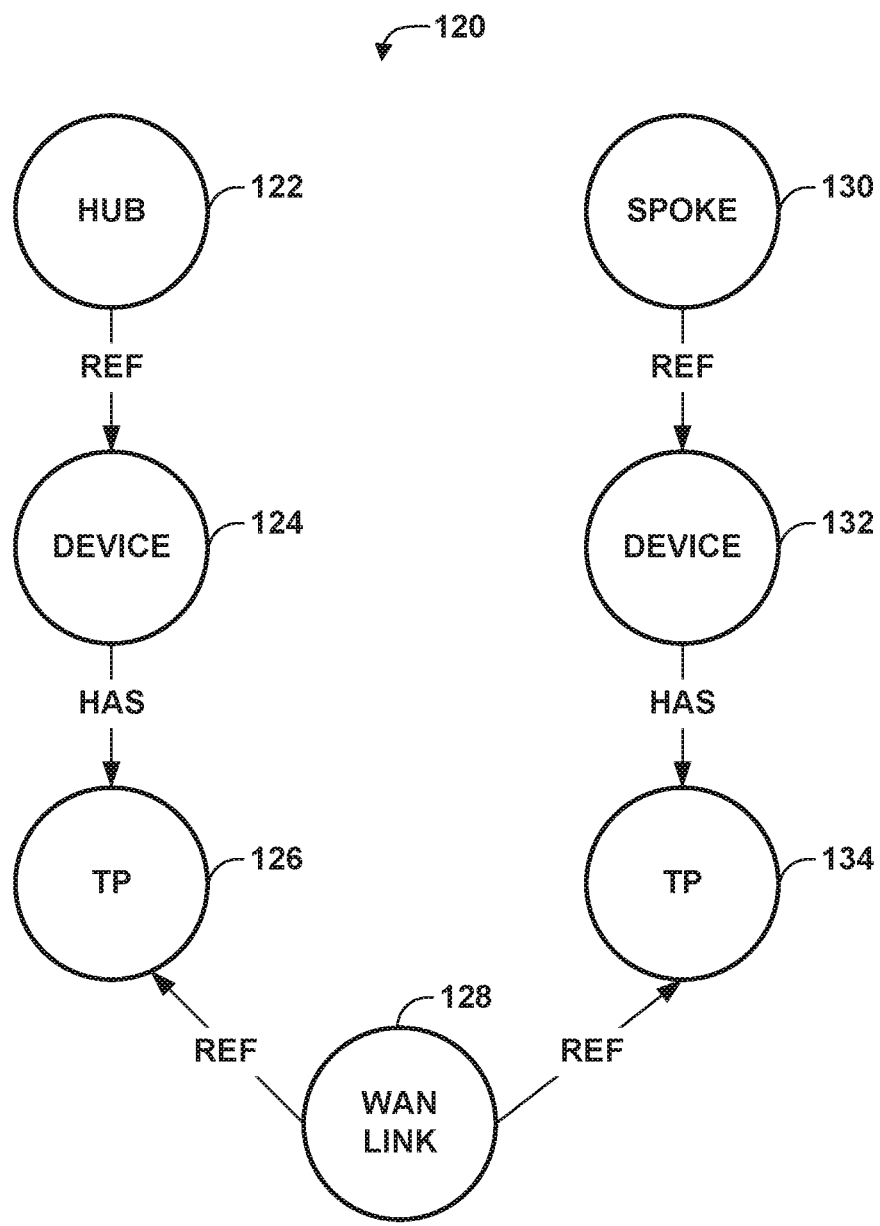
FIG. 5 is a conceptual diagram illustrating an example SDWAN intent instance with a hub and spoke topology.

FIG. 5 is a conceptual diagram illustrating an example SDWAN intent instance 120 with a hub and spoke topology. In this example, SDWAN intent instance 120 includes hub vertex 122, spoke vertex 130, device vertices 124, 132, termination point (TP) vertices 126, 134, and WAN link vertex 128. Hub vertex 122 has a reference "ref" edge to device vertex 124, spoke vertex 130 has a reference "ref" edge to device vertex 132, device vertices 124, 132 have respective "has" edges to respective TP vertices 126, 134, and WAN link 128 has respective reference "ref" edges to TP vertices 126, 134.

Figure 6:
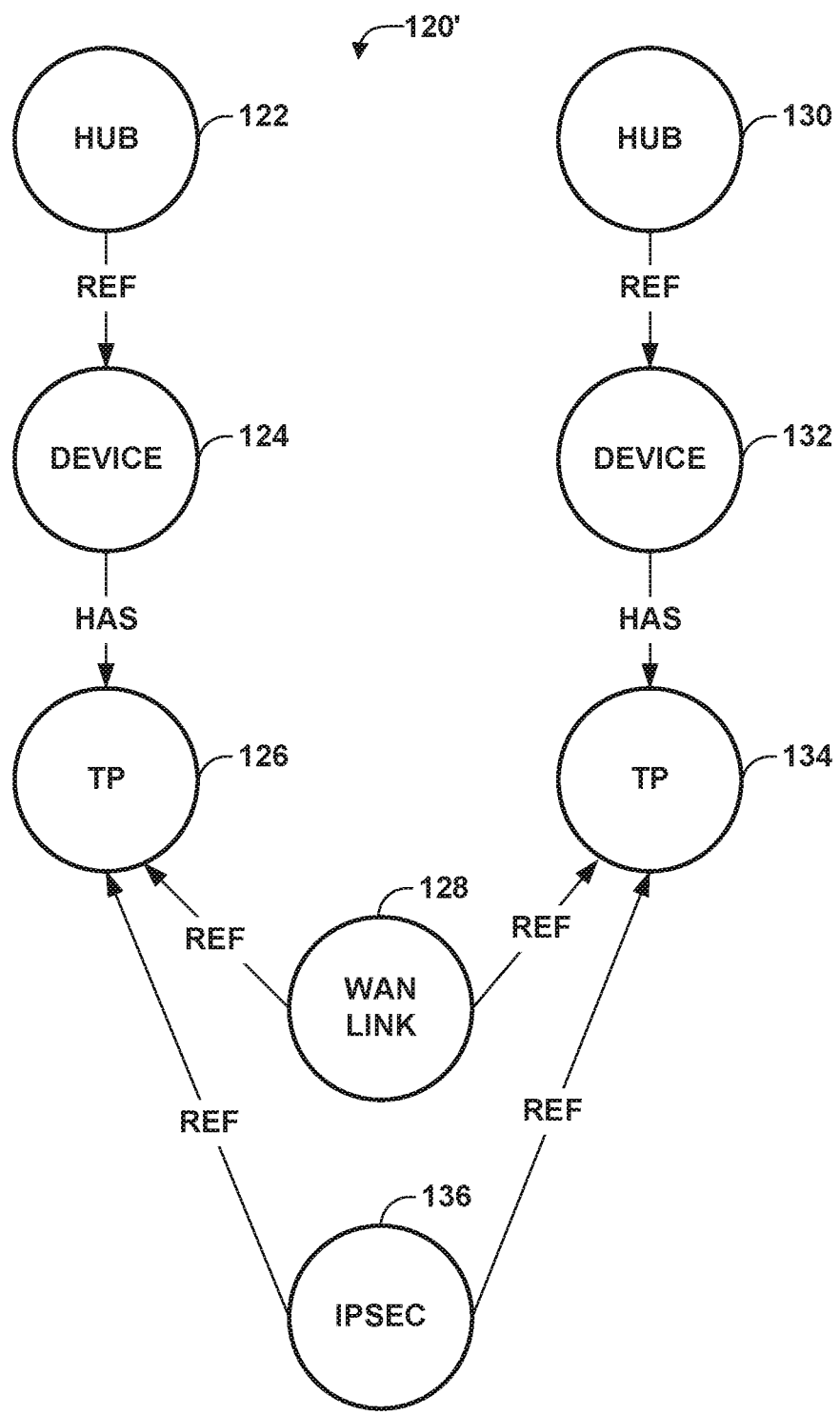
FIG. 6 is a conceptual diagram illustrating an example of an IPSEC link added to the SDWAN instance of FIG. 5, forming an updated SDWAN instance.

FIG. 6 is a conceptual diagram illustrating an example of an IPSEC link added to SDWAN instance 120 of FIG. 5, forming SDWAN instance 120'. That is, as a result of adding an IPSEC link to SDWAN instance 120, SDWAN instance 120' includes the vertices and edges of SDWAN instance 120, with the addition of IPSEC vertex 136. IPSEC vertex 136 has respective reference "ref" edges to TP vertices 126, 134. In this manner, the intent model for SDWAN instance 120 of FIG. 5 may be extended.

Figure 7:
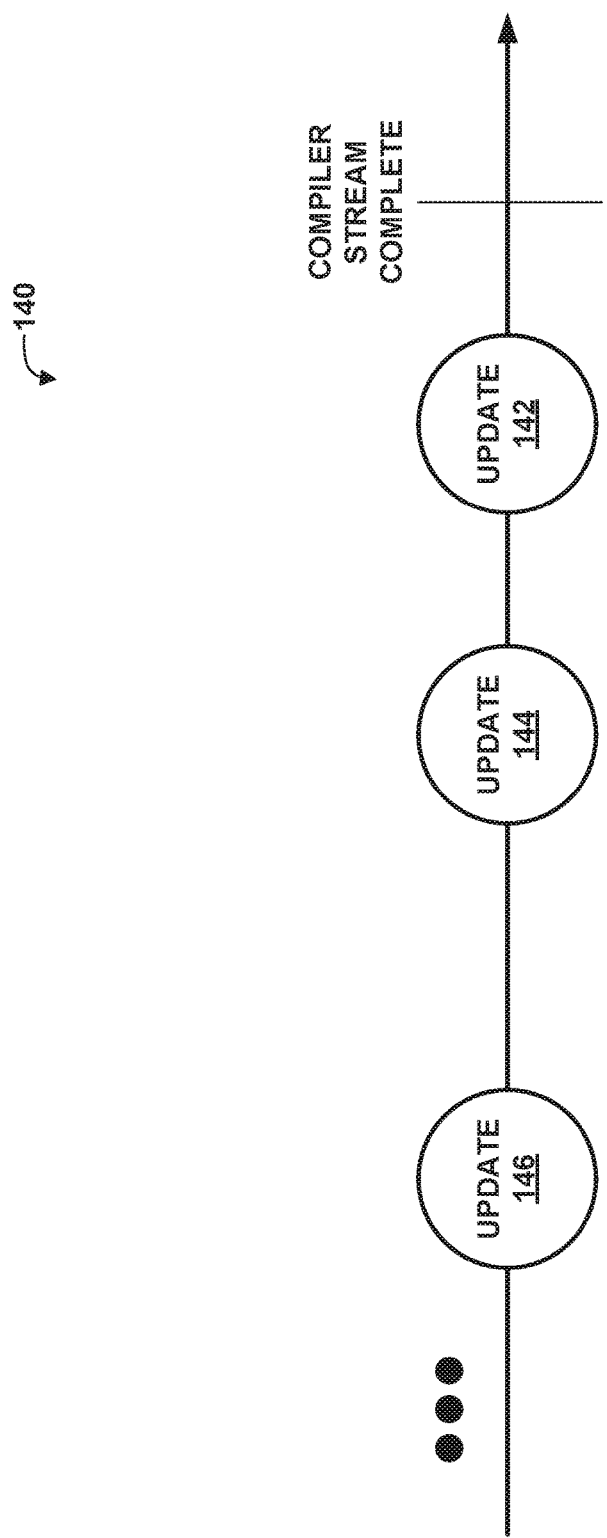
FIG. 7 is a conceptual diagram illustrating an example compiler stream on which reactive mappers listen for updates.

FIG. 7 is a conceptual diagram illustrating an example compiler stream 140 on which reactive mappers (e.g., mappers 112A-112C of FIG. 4) listen for updates. Compiler stream 140 includes updates 142, 144, 146, in this example. Each of updates 124, 144, 146, specifies respective mapper IDs, vertices, and operations. For example, update 142 may specify a mapper ID of "IPSEC," and a vertex and operation of "IPSEC vertex(op: create)." As another example, update 144 may specify a mapper ID of "provision-GRE-link" a vertex and operation of "GRE vertex(op: create)," and another vertex and operation of "TP vertex (op: create)."

Figure 8:
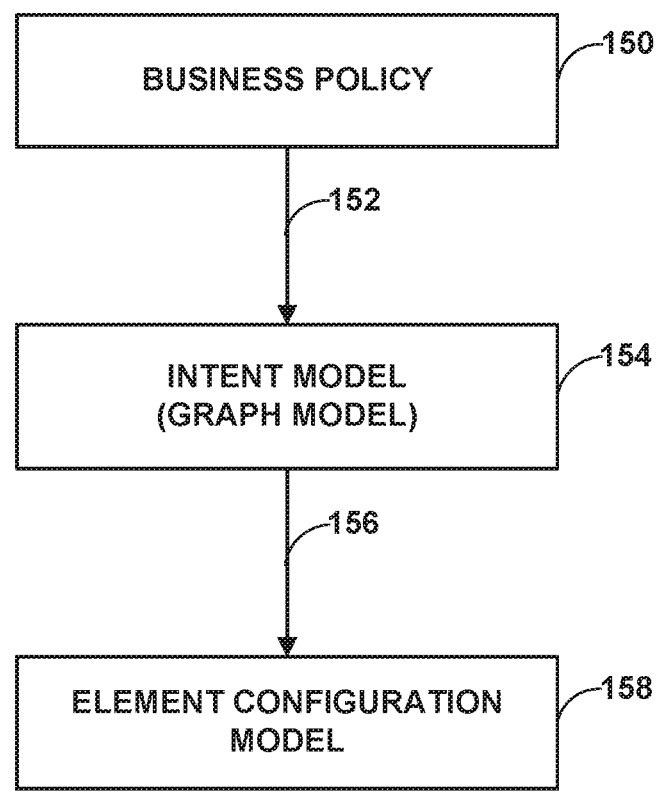
FIG. 8 is a conceptual diagram illustrating a process for converting user business policies into low-level configuration.

FIG. 8 is a conceptual diagram illustrating a process for converting user business policies into low-level configuration. In particular, a user defines a business policy 150. Business logic is applied to business policy 150 to convert business policy 150 into an intent model 154 (represented using a unified graph model, such as that of FIG. 8) (152). An intent compiler then compiles intent model 154 to form element configuration model 158 (156).

Stateful business policies can be written on top of a stateless intent layer. For example, a user may state the intent "provide high bandwidth VPN connectivity between sites A. B, and C with bandwidth between A-B, B-C, C-A, . . . ." This may lead to various stateless intents. The stateful intent may be compiled into a L3VPN (overlay tunnel) and a transport mechanism between A-B, B-C, C-A that provides the bandwidth required. For example, the transport mechanism may include an RSVP LSP between A-B with 30 Mbps, an RSVP LSP between B-C with 50 Mbps, and an RSVP LSP between C-A with 80 Mbps. In this instance, the RSVP LSP between C-A with 80 Mbps may need to be created. There could be a situation where more capacity is required, so there may yet be a further intent "optical intent: increase capacity between C-A." If there is already a 70 Mbps connection for C-A, the stateless intent may provision a new 10G lambda between C-A on an optical network.

When realizing stateful intents, a controller device, such as controller device 10, may need to account for existing stateless intents across endpoints, as well as the current state. In the above example, to perform the various intents, controller device 10 may query a connected graph (including stateless intents) and create/modify the stateless intents, as necessary. Techniques related to using unified graph models and intents are described in U.S. application Ser. No. 15/462,465, filed Mar. 17, 2017, which is incorporated by reference in its entirety. Thus, intent models can be represented using unified graph models. When more use cases are added, the intent model (i.e., the unified graph model) can be extended. Also, use of unified graph models allows for retrieval of intents based on endpoints (e.g., by querying the graph).

Figure 9:
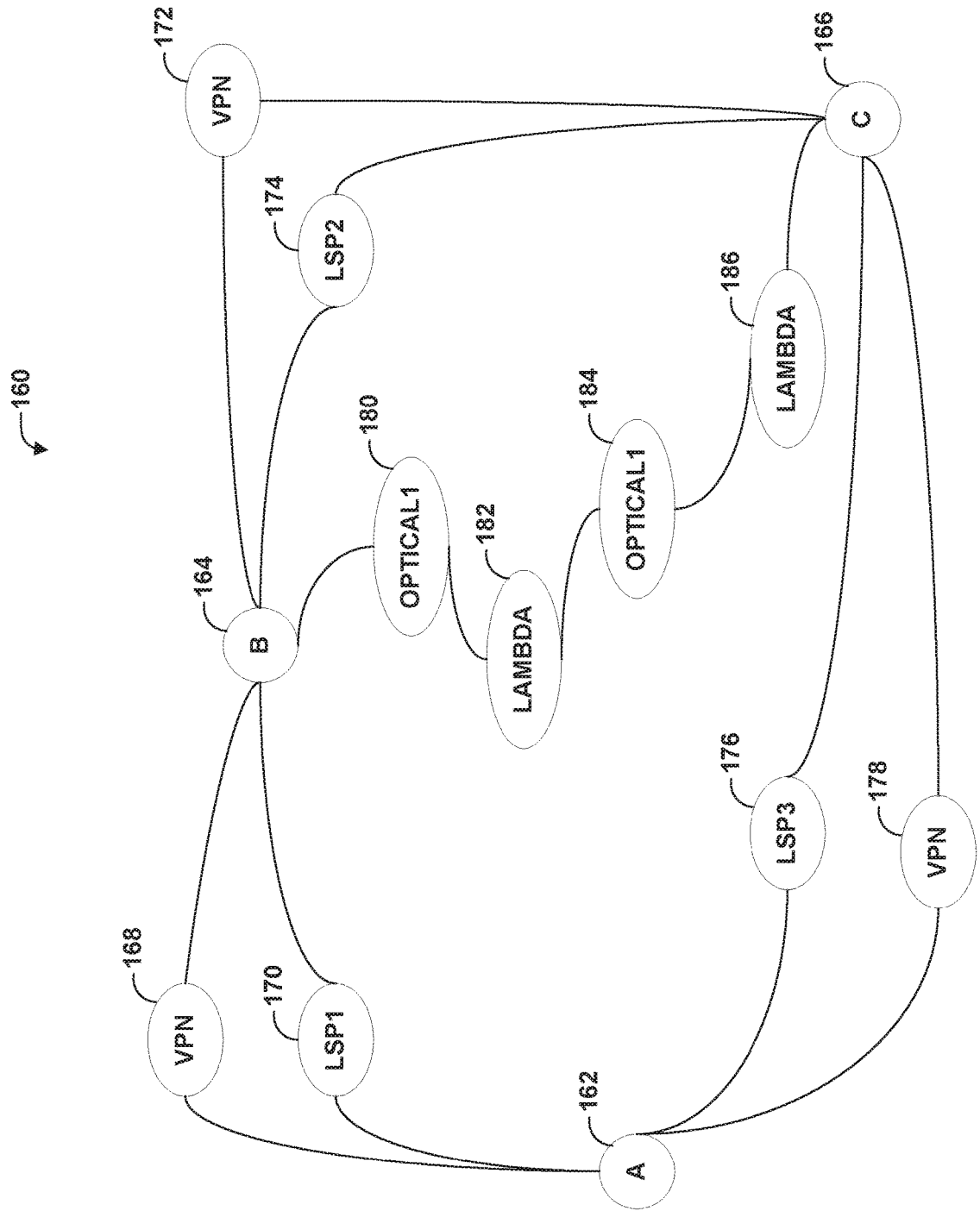
FIG. 9 is a conceptual diagram illustrating an example unified graph model for an intent model.

FIG. 9 is a conceptual diagram illustrating an example unified graph model 160 for an intent model. The example of unified graph model 160 of FIG. 9 corresponds to the example scenario discussed above with respect to FIG. 8. That is, unified graph model 160, in this example, includes nodes A 162, B 164, and C 166. As a result of modifications through intent model updates, node A 162 is coupled to node B 164 via VPN 168 and LSP1 170, Node B 164 is coupled to node C 166 via VPN 172 and LSP2 174, and node C 166 is coupled to node A 162 via VPN 178 and LPS3 176. Furthermore, as a result of the additional capacity being required as an optical intent, additional nodes optical 1180, lambda 182, optical 1184, and lambda 186 are added between node B 164 and node C 166.

Figure 10:
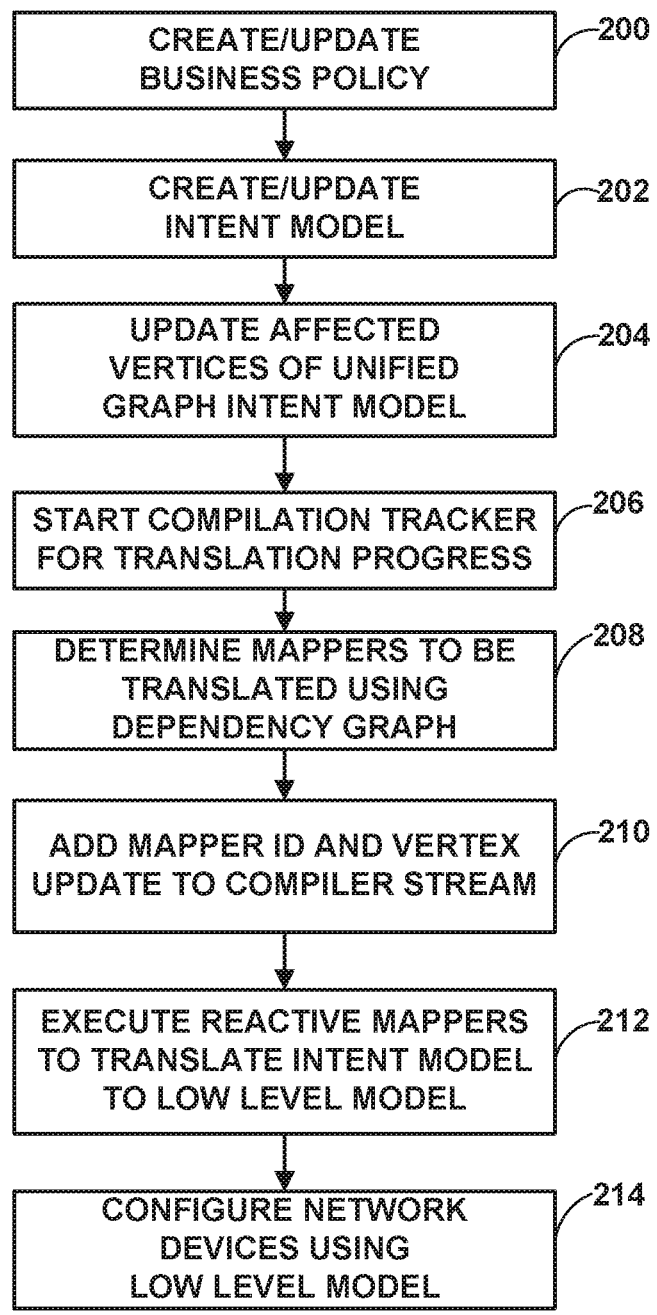
FIG. 10 is a flowchart illustrating an example method for performing techniques of this disclosure.

FIG. 10 is a flowchart illustrating an example method for performing techniques of this disclosure. Although explained with respect to controller device 10 of FIGS. 1 and 2, it should be understood that this or a similar method may be performed by other such management devices.

Initially, an administrator or other user creates or updates a business policy (200). The administrator may then create or update an intent model (202) to reflect the created or updated business policy. Controller device 10 may then receive the created or updated intent model and update affected vertices of a unified graph intent model (204). As noted above, the graph model represents an intent model of managed network devices, such as elements 14 of FIG. 1. The graph model may be expressed in, e.g., Yang or JSON. The modifications may be provided as part of a compiler stream in the format of <mapper id, vertices>, and controller device 10 may execute reactive mappers that are subscribed to the compiler stream. The compiler stream may contain mapper identifier (id) values and vertices of a corresponding unified graph model representing an intent model affected by the modifications.

Accordingly, controller device 10 may start a compilation tracker for translation progress (206). Controller device 10 determines mappers to be translated using a dependency graph (208), constructed according to the processes discussed above. Controller device 10 may add a mapper ID and vertex update to a compiler stream (210). Controller device 10 then executes the reactive mappers to translate the intent model to a low level model (212) and configures network devices using the low level model (214).

In this manner, the method of FIG. 10 represents an example of a method including receiving, by a controller device that manages a plurality of network devices, data representing a modification to the unified intent model represented by a graph model; determining, by the controller device, one or more vertices of the graph model affected by the data representing the modification; updating, by the controller device, the one or more vertices of the graph model affected by the data representing the modification; compiling, by the controller device, the updated one or more vertices to generate low level configuration data for the plurality of network devices; and configuring, by the controller device, one or more of the plurality of network devices with the low level configuration data.

Thus, the techniques of this disclosure may be summarized as including:

An approach to support extensibility of a graph-based intent models. That is, customers may be able to extend the intent model based on their network and extend compilation logic for the extended model.

An approach to use reactive mappers for compiling the intent models to improve performance using reactive streams.

An approach to incrementally compile the graph model to the low level configuration data.

An approach to allow the same mapper for intent create/update/delete scenarios for graph model updates.

An approach to track translations and triggering deployment, once all translations are completed.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
receiving, by a controller device that manages a plurality of network devices, data representing a modification to a unified intent model represented by a graph model;
determining, by the controller device, one or more vertices of the graph model affected by the data representing the modification and one or more vertices to be added to the graph model to extend the unified intent model;
updating, by the controller device, the one or more vertices of the graph model affected by the data representing the modification and adding the one or more vertices to be added to the graph model;
constructing reactive mappers associated with the one or more vertices of the graph model to include mapper identifiers and data representing a list of resources corresponding to other vertices of the graph model impacted by changes to the vertex associated with the reactive mapper;
compiling, by the controller device, the updated one or more vertices and the added one or more vertices to generate low level configuration data for the plurality of network devices, wherein compiling the updated one or more vertices comprises:
identifying mapper identifiers and corresponding vertex operations in a compiler stream;
determining one or more of the reactive mappers at least one of having a mapper identifier matching the identified mapper identifiers or being associated with vertices of the graph model impacted by the updated one or more vertices or the one or more added vertices; and
performing the vertex operations using the determined one or more of the reactive mappers to generate the low level configuration data; and
configuring, by the controller device, one or more of the plurality of network devices with the low level configuration data.

2. The method of claim 1, wherein determining the one or more vertices of the graph model affected by the data representing the modification comprises determining one or more new vertices to add to the graph model and one or more has-edges or reference-edges to add to the graph model between existing vertices and new vertices according to parent-child relationships between graph model elements.

3. The method of claim 1, wherein the reactive mappers are the same for each of vertex creations, updates, and deletes to the graph model, and wherein constructing the reactive mappers comprises constructing the reactive mappers to include a name attribute representing the respective mapper identifier, a version attribute, a resource context attribute, a list of resources attributes comprising the data representing the list of resources corresponding to the other vertices of the graph model impacted by changes to the vertex, and an output attribute.

4. The method of claim 1, wherein compiling the updated one or more vertices comprises:
navigating a dependency graph recursively for each updated vertex to determine dependent vertices;
determining whether mappers are registered for the updated vertices and the dependent vertices;
adding messages conforming to a format comprising a pair of elements comprising (mapper identifier, vertex content) to a compiler stream for each updated vertex; and
fetching, by reactive mappers indicated by the mapper identifiers, dependent information based on resources in the reactive mappers in response to detecting a corresponding mapper identifier in the compiler stream.

5. The method of claim 1, wherein determining the one or more vertices affected by the data representing the modification comprises determining that a plurality of the vertices of the graph model are affected by the data representing the modification, wherein updating the one or more vertices comprises updating the plurality of vertices, and wherein compiling the updated one or more vertices comprises compiling the updated one or more vertices in parallel.

6. The method of claim 1, wherein compiling the updated one or more vertices comprises incrementally compiling the one or more vertices without compiling non-updated vertices of the graph model.

7. The method of claim 1, further comprising tracking progress of compilation of the updated one or more vertices.

8. A controller device that manages a plurality of network devices, the controller device comprising one or more processing units, implemented using digital logic circuitry, configured to:
receive data representing a modification to unified intent model represented by a graph model;
determine one or more vertices of the graph model affected by the data representing the modification and one or more vertices to be added to the graph model to extend the unified intent model;
update the one or more vertices of the graph model affected by the data representing the modification and add the one or more vertices to be added to the graph model;
construct reactive mappers associated with the one or more vertices of the graph model to include mapper identifiers and data representing a list of resources corresponding to other vertices of the graph model impacted by changes to the vertex associated with the reactive mapper;

compile the updated one or more vertices and the added one or more vertices to generate low level configuration data for the plurality of network devices, wherein to compile the updated one or more vertices, the one or more processing units are configured to:

identify mapper identifiers and corresponding vertex operations in a compiler stream;

determine one or more of the reactive mappers at least one of having a mapper identifier matching the identified mapper identifiers or being associated with vertices of the graph model impacted by the updated one or more vertices or the one or more added vertices; and perform the vertex operations using the determined one or more of the reactive mappers to generate the low level configuration data; and configure one or more of the plurality of network devices with the low level configuration data.

9. The controller device of claim 8, wherein to determine the one or more vertices of the graph model affected by the data representing the modification, the processing units are configured to determine one or more new vertices to add to the graph model and one or more has-edges or reference-edges to add to the graph model between existing vertices and new vertices according to parent-child relationships between graph model elements.

10. The controller device of claim 8, wherein the reactive mappers are the same for each of vertex creations, updates, and deletes to the graph model, and wherein the one or more processors are further configured to construct the reactive mappers to include a name attribute representing the respective mapper identifier, a version attribute, a resource context attribute, a list of resources attributes comprising the data representing the list of resources corresponding to the other vertices of the graph model impacted by changes to the vertex, and an output attribute.

11. The controller device of claim 8, wherein to compile the updated one or more vertices, the one or more processing units are configured to:

navigate a dependency graph recursively for each updated vertex to determine dependent vertices;

determine whether mappers are registered for the updated vertices and the dependent vertices;

add messages conforming to a format comprising a pair of elements comprising (mapper identifier, vertex content) to a compiler stream for each updated vertex; and execute reactive mappers to indicated by the mapper identifiers to fetch dependent information based on resources in the reactive mappers in response to detecting a corresponding mapper identifier in the compiler stream.

12. The controller device of claim 8, wherein when a plurality of the vertices of the graph model are affected by the data representing the modification, the one or more processing units are configured to compile the updated one or more vertices in parallel.

13. A non-transitory computer-readable storage medium having stored thereon instructions that, when executed, cause a processor of a controller device that manages a plurality of network devices to:

receive data representing a modification to unified intent model represented by a graph model;

determine one or more vertices of the graph model affected by the data representing the modification and one or more vertices to be added to the graph model to extend the unified intent model;

update the one or more vertices of the graph model affected by the data representing the modification and add the one or more vertices to be added to the graph model;

construct reactive mappers associated with the one or more vertices of the graph model to include mapper identifiers and data representing a list of resources corresponding to other vertices of the graph model impacted by changes to the vertex associated with the reactive mapper;

compile the updated one or more vertices and the added one or more vertices to generate low level configuration data for the plurality of network devices, wherein the instructions that cause the processor to compile the updated one or more vertices comprise instructions that cause the processor to:

identify mapper identifiers and corresponding vertex operations in a compiler stream;

determine one or more of the reactive mappers at least one of having a mapper identifier matching the identified mapper identifiers or being associated with vertices of the graph model impacted by the updated one or more vertices or the one or more added vertices; and perform the vertex operations using the determined one or more of the reactive mappers to generate the low level configuration data; and configure one or more of the plurality of network devices with the low level configuration data.

14. The non-transitory computer-readable storage medium of claim 13, wherein the instructions that cause the processor to determine the one or more vertices of the graph model affected by the data representing the modification comprise instructions that cause the processor to determine one or more new vertices to add to the graph model and one or more has-edges or reference-edges to add to the graph model between existing vertices and new vertices according to parent-child relationships between graph model elements.

15. The non-transitory computer-readable storage medium of claim 13, wherein the reactive mappers are the same for each of vertex creations, updates, and deletes to the graph model, wherein the instructions that cause the processor to construct the reactive mappers comprise instructions that cause the processor to construct the reactive mappers to include a name attribute representing the respective mapper identifier, a version attribute, a resource context attribute, a list of resources attributes comprising the data representing the list of resources corresponding to the other vertices of the graph model impacted by changes to the vertex, and an output attribute.

16. The non-transitory computer-readable storage medium of claim 13, wherein the instructions that cause the processor to compile the updated one or more vertices comprise instructions that cause the processor to:

navigate a dependency graph recursively for each updated vertex to determine dependent vertices;

determine whether mappers are registered for the updated vertices and the dependent vertices;

add messages conforming to a format comprising a pair of elements comprising (mapper identifier, vertex content) to a compiler stream for each updated vertex; and execute reactive mappers to indicated by the mapper identifiers to fetch dependent information based on resources in the reactive mappers in response to detecting a corresponding mapper identifier in the compiler stream.

17. The non-transitory computer-readable storage medium of claim 13, wherein when a plurality of the vertices of the graph model are affected by the data representing the modification, the instructions cause the processor to compile the updated one or more vertices in parallel.

\* \* \* \* \*